(12) United States Patent
Kallesøe et al.

(10) Patent No.: US 9,405,297 B2
(45) Date of Patent: Aug. 2, 2016

(54) SYSTEM AND METHOD FOR PRESSURE CONTROL IN A NETWORK

(75) Inventors: Carsten Skovmose Kallesøe, Viborg (DK); Jacob Saksvold Mortensen, Viborg (DK)

(73) Assignee: Grundfos Management a/s, Bjerringbro (DK)

( * ) Notice: Subject to any disclaimer, the term of this patent is extended or adjusted under 35 U.S.C. 154(b) by 381 days.

(21) Appl. No.: 13/979,254

(22) PCT Filed: Dec. 21, 2011

(86) PCT No.: PCT/EP2011/073708
§ 371 (c)(1),
(2), (4) Date: Jul. 11, 2013

(87) PCT Pub. No.: WO2012/095249
PCT Pub. Date: Jul. 19, 2012

(65) Prior Publication Data
US 2013/0289781 A1  Oct. 31, 2013

(30) Foreign Application Priority Data
Jan. 14, 2011 (EP) .................................... 11000265

(51) Int. Cl.
*G06F 19/00* (2011.01)
*G05D 7/06* (2006.01)
(Continued)

(52) U.S. Cl.
CPC ............... *G05D 7/0641* (2013.01); *E03B 1/02* (2013.01); *F04D 13/14* (2013.01); *F04D 15/0066* (2013.01); *F04D 15/0227* (2013.01)

(58) Field of Classification Search
CPC ... G05D 7/0641; F04D 15/0227; F04D 13/14; F04D 15/0066
USPC ........................................................ 700/282
See application file for complete search history.

(56) References Cited

U.S. PATENT DOCUMENTS 2,741,986 A    4/1956  Smith
8,010,329 B2 *  8/2011  Kallenbach ............. G06F 17/50
                                                137/367

(Continued)

FOREIGN PATENT DOCUMENTS

EP    1 298 325 A2    4/2003
JP    2006-063842 A   3/2006

OTHER PUBLICATIONS

"Leak detection for underground storage tanks", Durgin et al, STP 1161, 1993.*

(Continued)

*Primary Examiner* — Michael D Masinick
(74) *Attorney, Agent, or Firm* — Panitch Schwarze Belisario & Nadel LLP (57) ABSTRACT

A system and a method for controlling the pressure of a fluid in a distribution network. The network includes at least one pump station having a number of pumps that are configured to pressurize the fluid from a supply line; means for determining at least one flow value (Q) of at least a part of the distribution network and a control unit for controlling the activity and/or speed of the pump(s) of the pump station according to a predefined pump curve defining the relationship between the pressure and the flow of the fluid pressurized by the pump station. The control unit is configured to change the pump curve automatically according to at least one determined flow value (Q).

17 Claims, 5 Drawing Sheets

(51) Int. Cl.
 *F04D 13/14* (2006.01)
 *F04D 15/00* (2006.01)
 *E03B 1/02* (2006.01)
 *F04D 15/02* (2006.01)

(56) References Cited

U.S. PATENT DOCUMENTS

| | | |
|---|---|---|
| 2002/0033420 A1 | 3/2002 | Paarporn |
| 2002/0096219 A1 | 7/2002 | Frasure et al. |
| 2007/0021936 A1* | 1/2007 | Marovitz ............... E03F 7/00 702/100 |
| 2007/0150113 A1* | 6/2007 | Wang ................. G05D 7/0641 700/282 |
| 2009/0094002 A1* | 4/2009 | Kallenbach ............ G06F 17/50 703/1 |
| 2009/0207564 A1* | 8/2009 | Campbell ............. G01F 1/6965 361/688 |
| 2010/0212748 A1* | 8/2010 | Davidoff .................. F17D 5/02 137/10 |
| 2013/0220451 A1* | 8/2013 | Ohmi ...................... G01F 1/363 137/487 |
| 2013/0289781 A1* | 10/2013 | Kallesoe ................. F04D 13/14 700/282 |
| 2014/0251478 A1* | 9/2014 | Dolezilek ............ G05D 7/0641 137/861 |

OTHER PUBLICATIONS

Int'l Search Report and Written Opinion issued on Feb. 28, 2012 in Int'l Application No. PCT/EP2011/073708.

* cited by examiner

SYSTEM AND METHOD FOR PRESSURE CONTROL IN A NETWORK

CROSS-REFERENCE TO RELATED APPLICATIONS

This application is a Section 371 of International Application No. PCT/EP2011/073708, filed Dec. 21, 2011, which was published in the English language on Jul. 19, 2012, under International Publication No. WO 2012/095249 A1 and the disclosure of which is incorporated herein by reference.

BACKGROUND OF THE INVENTION

The present invention relates to a system and method for controlling the pressure in a distribution network for distribution of fluids. The fluids may be drinking water, gas, or water based district heating by way of example.

The invention, in particular, relates to a system and method for controlling the pressure in a distribution network with changing flow conditions.

In fluid distribution networks such as mains water distribution networks the pressure is normally created by pumps. However, the pressure may also be created by the gravity head of water in a water tower or another reservoir and then the pressure may be regulated by valves.

In mains water distribution networks the pressure in the arterial supply pipes is significantly higher than the pressure required by the consumers (the end-user). The pressure is traditionally created by the use of a pump station that may comprise several pumps. In order to provide the required pressure at the consumer, the pump station traditionally builds up a pressure that is larger than the required pressure because the provided pressure is required to exceed a predefined minimum pressure (typically 2 bar) at the consumers under all conditions. Typically a pump station is configured to deliver a pressure according to a fixed constant pressure curve that is chosen so that the provided pressures at the consumers exceed the required minimum pressure. This regulation strategy ensures that the required pressure is provided constantly, however, a huge amount of energy and fluid (through fluid leakage) is typically wasted. In a water distribution system, the manager of the waterworks knows what pressure is needed when the flow is at its maximum. However, the manager does not always know the exact value of the maximum flow.

Due to changing flow and pressure conditions in a distribution network the actual pressure typically exceeds the required pressure most of the time. This "too high" pressure may cause leakages in the distribution network causing fluid losses and pipe breakdown.

It is desirable to specify a system and method for controlling the pressure in a distribution network in which the fluid losses can be minimised without violating the performance.

It is also desirable to specify a system and method for controlling the pressure in a distribution network that is capable of automatically adapting to actual pressure and/or flow conditions in the network.

BRIEF SUMMARY OF THE INVENTION

A system as described below has a control unit configured to change the pump curve automatically according to at least one determined flow value. A method as described below has a pump curve that is changed automatically according to at least one determined flow value.

The flow value may be any suitable value such as a measured, calculated or estimate flow or flow difference (e.g. the difference between a reference flow and a measured or calculated flow). The flow value may be provided by any suitable method, such as by a flow sensor, for example.

By changing the pump curve automatically according to at least one determined flow value the generated pressure can be adjusted by using a pressure curve that makes it possible to reduce the generated pressure so that the fluid losses can be minimised without violating the performance. The pressure in the distribution network can be regulated (adjusted or maintained according to a predefined criteria) according to a pump curve that is automatically adapted to the determined flow value which means that the pressure in the distribution network can be adjusted or maintained so that the flow and pressure correspond to the predefined pump curve. A pump curve may be used until the pump curve has been changed according to the at least one determined flow value. In fact a pump curve may be used as long as the pump curve is the most suitable pump curve.

By the term pump curve (Q-H pump curve) is meant the curve describing the relationship between the flow and head (pressure). It is known that different pump curves can be achieved by changing the speed of a pump e.g., by using a frequency converter. Normally, the head at zero flow at the Q-H pump curve is denoted $H_0$ and the head corresponding to the highest hydraulic power is denoted $H_{ref}$. In the following there will be referred to pump curves having predefined characteristics and being defined by $H_{min}$ (the pressure corresponding to maximal flow ($Q_{min}$)) and $H_{max}$ (the pressure corresponding to maximal flow ($Q_{max}$)). The shape of the pump curve may have any suitable form. The pump curve may be linear or quadratic by way of example.

In an embodiment of the present invention the pump curve is maintained until a predefined event occurs. In this way the pressure can be regulated according to the most suitable pump curve and this pump curve will be used until a predefined event occurs. A possible event may be a detection of a very low or a very high flow by way of example.

In an embodiment of the present invention the at least one flow value is a determined peak flow and/or a minimum flow of the fluid pressurised by the pump station within a predefined time period, and the control unit is configured to adjust the maximal flow of the pump curve according to a determined peak flow and/or to adjust the minimum flow of the flow curve according to a determined minimum flow.

Hereby it is achieved that the form of the pump curve can be adjusted automatically according to the peak flow and/or the minimum flow. Accordingly, it is possible to provide a specific adaptation and regulation of the pump curve so that the generated pressure can be adjusted to the actual required pressure in order to minimise the fluid losses without violating the performance.

By the term peak flow is meant a high flow value. The peak flow may be the maximal flow or the highest flow measured within a specific time period. However, if the network is subject to very changing condition the magnitude of peak flows determined at different time periods may differ significantly.

The minimum flow is referred to as a low flow value. The minimum flow may be the lowest flow or the lowest flow measured within a specific time period and in case that the network is being subject to very changing condition the magnitude of minimum flows at one time may differ significantly from the magnitude of minimum flows at one time.

In an embodiment of the present invention the at least one flow value is measured (e.g. continuously) and the control unit is configured to change the pump curve automatically by changing the maximum flow parameter and/or the minimum flow parameter of a predefined pump curve as function of time. It may be an advantage that the regulation of the pressure is based on a pump curve that is specified according to a predefined pump curve form and one or more determined flow values. The regulation of the pressure may be carried out continuously according to a pump curve and hence the gab between the provided pressure and the pressure needed in the distribution network can be minimised. By continuously is meant that measurements are carried out all the times, however, the sampling period of the measurements may be selected to meet specific requirements. In the prior art the pressure regulation is typically carried out by using a constant pressure regime. Therefore, regulation according to a linear, quadratic or other suitable pump curve may reduce the gab between the provided pressure and the pressure needed in the distribution network dramatically. Hereby, energy consumption and fluid losses can be minimised.

It is beneficial that the pressure in the distribution network is adjusted according to a pump curve that is defined based on measured flow values. The maximum flow parameter may be the max flow defined as the maximal flow or the highest flow measured within a specific time period. The minimum flow parameter may be the lowest flow or the lowest flow measured within a specific time period.

By the term continuously is meant that the at least one flow value is being measured all the time, however; the sampling rate for the flow value measurement(s) may be chosen as any suitable time period (e.g. a few seconds, minutes or hours by way of example). In fact the time period could, in principle, be any time period. A predefined pump curve may have any suitable form. The curve may be line or quadratic, by way of example, however; the curve may have another form.

The maximum flow parameter of a predefined pump curve may be the largest flow value at the pump curve whereas the minimum flow parameter of a predefined pump may be the lowest flow value at the pump curve.

In one embodiment of the invention at least one pressure sensor is arranged in the distribution network and the control unit is configured to change the maximal pressure parameter and/or the minimum pressure parameter and/or one or more intermediate pressure parameters of the pump curve automatically according to at least one pressure value provided by at least one pressure sensor. By arranging one or more pressure sensors in the distribution network configuring the control unit to change the maximal pressure parameter of the pump curve automatically according to at least one pressure value provided by at least one pressure sensor the regulation of the pump curve can be carried out on the basis of one or more valid pressure measurements at specific locations in the distribution network. These locations may be selected in any suitable way. By way of example it is possible to arrange the sensors at so-called critical points (points at which minimum pressure is expected) in the network.

When a pressure parameter of a pump curve is changed the shape of the pump curve is altered. It is possible to keep the maximal pressure, intermediate and minimum pressure parameters of the pump curve and merely change the flow values. However, it is also possible to change the pressure parameters according to one or more pressure values provided by sensors arranged in the distribution network by way of example.

When sensors are arranged in the distribution network it is possible to optimise the pump curve according to measured pressure values. When no sensors are available in the distribution network it may be possible to simply adjust the flow parameters of the pump curve when a low or high flow value is detected because this will indicate that it would be an advantage to change the used pump curve.

In one embodiment of the present invention the control unit is configured to change the maximal pressure parameter and/or the minimum pressure parameter and/or one or more intermediate pressure parameters of the pump curve automatically when a max flow and/or a minimum flow and/or a pressure value is determined. Hereby it can be achieved that the pump curve is maintained during stabile conditions and that the pump curve can be changed when the determined flow is very high (e.g. when a max flow is determined) or very low (when a minimum flow is determined). The determined flow may be a flow measurement provided by a flow sensor, however; it may also be a calculated or estimated value. It is possible to change one or more pressure parameters of the pump curve. As long as the flow lies within a predefined flow interval the pressure may be regulated by using a pump curve that corresponds to this predefined flow interval. However, when a flow outside this predefined flow interval is detected, it will be possible to adjust the pump curve accordingly. If a very high flow is detected, by way of example, it is possible to adjust the maximal pressure parameter. It is possible to change the pump curve according to any of the detected value or values that are derived from the detected values.

In one embodiment of the present invention the control unit is configured to apply different predefined sets of curves for different time periods (e.g. different curves for different days). By way of example it is possible to generate different sets of regulation regimes corresponding to e.g., working days and weekends, respectively or to day time and night time, respectively. The regulation principles may be the same for different sets of regulation time regimes—it is possible just to use different values to change the pump curves. By way of example it is possible to use a proportionality curve or a quadratic curve for regulation during both day and night time. Each of these curves can be adjusted separately according to the methods described in this document.

In one embodiment of the present invention the control unit is configured to change the pump curve automatically according to corresponding flow and pressure values determined in the distribution network. When the distribution network includes means for determining flow and pressure values this information may be used to regulate the pressure curve according to an optimisation criterion that is based on corresponding flow and pressure values determined in the distribution network In one embodiment of the present invention the control unit is configured to optimise the pump curve according to predefined pressure values provided by at least one of the pressure sensors. Hereby it is possible to use one or more pressure sensors to provide pressure information and use this information define pressure curves that can be used for regulating the distribution network. In this manner the control unit may "learn" or "adapt" the pump curve to the distribution network.

It is possible to use a predefined pump curve that is a proportional curve or a quadratic curve.

It may be an advantage that the distribution unit includes at least one pressure sensor that is configured to communicate wirelessly with the control unit. Hereby it is possible to provide communication between a sensor and the control unit in an easy and flexible way even when the sensor and the control unit are placed far from each other.

The distribution network may be a water distribution network having a plurality of end users. Water distribution networks are widely used and the potential for reducing water leakage is very high. Another example of a distribution network is a district heating system delivering heated water to a number of end users.

It may be an advantage that at least one sensor is arranged at a point in the distribution network where a minimum pressure is expected and/or at a point in the distribution network where the pressure is expected to exceed a predefined value. Typically the pressure in the so-called critical points (points at which minimum pressure is expected) in the network should exceed a predefined value in order to ensure optimal performance and avoid ingress of contaminated water from outside into the distribution network.

In one embodiment of the method according to the present invention the at least one flow value is a determined max flow and/or a minimum flow of the fluid within a predefined time period and the maximal flow of the pump curve is set to the determined peak flow and/or that the minimum flow of the flow curve is set to the determined minimum flow.

Thus, the pump curve can be adjusted automatically according to the max flow and/or the minimum flow and hereby a specific adaptation and regulation of the pump curve can be provided so that the generated pressure can be adjusted to the actual required pressure so that the fluid losses can be minimised.

In one embodiment of the method according to the present invention the at least one flow value is measured continuously and that the pump curve is changed automatically by changing the maximum flow parameter and/or the minimum flow parameter and/or one or more intermediate flow parameters of a predefined pump curve as function of time. This method makes it possible to change the pump curve on the basis of events that indicates that the pump curve should be adjusted. Accordingly, the pressure regulation is carried out continuously by using the most suitable pump curve and hence the difference between the provided pressure and the pressure needed in the distribution network can be minimised even when the conditions in the distribution network are changing.

In one embodiment of the method according to the present invention the pump curve is changed automatically according to corresponding flow and pressure values determined in the distribution network. In case that the distribution network includes means for determining flow and pressure values these values may be applied to regulate the pressure curve as intended.

In one embodiment of the method according to the present invention the method includes:
a) at least one flow is measured in the distribution network;
b) it is determined whether the at least one measured flow lies within a predefined flow area;
c) at least one pressure is measured in the distribution network;
d) a pump curve is calculated so that the difference between the measured pressure and a predefined pressure is minimised
e) the pressure of the fluid in the distribution network is regulated according to the calculated pump curve.

Hereby a very specific pump curve regulation can be achieved. The flow area is divided into a number of segments and the pump curve can be specified in each of these segments. A very specific pump curve form can be achieved by using this principle.

In one embodiment of the method according to the present invention includes:
a) at least one request signal is sent from the control unit to one or more pressure sensors in the distribution network and that;
b) pressure information is sent from the one or more pressure sensors in the distribution network to the control unit and that
c) a pump curve is calculated so that the difference between the measured pressure and a predefined pressure is minimised and that
d) the pressure of the fluid in the distribution network is regulated according to the calculated pump curve.

This method makes it possible to send a request to a pressure sensor in the distribution network and use the returned pressure information to regulate the pump curve so that the provided pressure at the place at which the pressure sensor is placed is adjusted towards preset requirements. The pressure sensors may be configured to measure pressure as they are supplied with energy (for instance electrical energy from the mains or a battery). The sensors should be adapted to receive request signals sent from the control unit and to send pressure information to the control unit when a request signal is received. It is possible to use sensors that are configured to measure pressure information only when a request signal is received. In this way energy for performing the pressure measurements and for sending pressure information to the control unit may be reduced. The pressure sensors may measure an absolute pressure or pressure difference (a pressure difference between to pipes or between a predefined reference and a measured pressure by way of example).

In one embodiment of the method according to the present invention at least one pressure sensor arranged in the distribution network is configured to generate an alarm if the measured pressure and/or pressure difference is above a first predefined value or below a second predefined value. Hereby it is possible to minimise the rate of which information is sent from the sensor(s) to the control unit and hence the energy supply of the sensor may have a lower capacity and/or a longer life time.

It may be an advantage if the data transfer between a sensor in the distribution network and the control unit is wireless. The data transfer between a sensor in the distribution network and the control unit is carried out by using a wireless network (e.g. the Global System for Mobile Communications (GSM)), preferably as a text communication service, preferably a Short Message Service (SMS).

The invention is not limited to the described embodiments which can be modified in many ways. This applies in particular to the shape of the pump curves and the distribution networks.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Preferred embodiments of the present invention will now be more particularly described, by way of example, with reference to the accompanying drawing, wherein.

In the drawings.

DETAILED DESCRIPTION OF THE INVENTION

Figure 1:
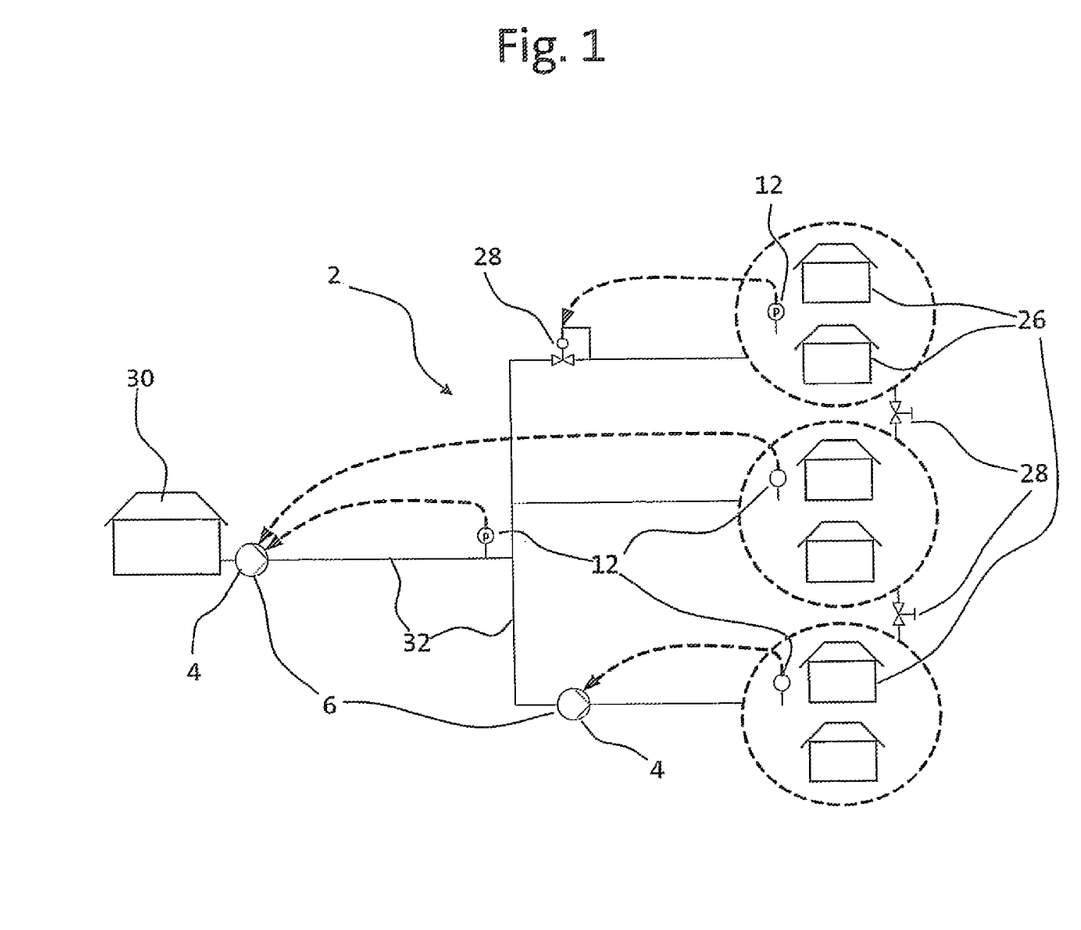
FIG. 1 shows a prior art water distribution network.

FIG. 1 illustrates a prior art water distribution network 2. The distribution network 2 is a water distribution network configured to deliver water from a waterworks 30. The water is pressurised by two pump stations 4 that may comprises a number of pumps 6 (even though only one pump is illustrated the pump station 4 may comprise several pumps 6). The distribution network includes a pipe system 32 is configured so that water can be delivered to a number of end users 26. A number of pressure sensors 12 and a number of pressure reduction valves 28 are arranged in the network 2.

The pump stations 4 pressurises the water to a preset level. The pressure sensors 12 send information to the pump stations 4 so that the required pressure can be provided constantly. A number of pressure reduction valves 28 are configured to reduce the pressure to different end users 26. Accordingly, it can be achieved that the pressure at the end users 26 is reduced to a level that minimises the chance of pipe break down in the end user section of the network 2. The pressure reduction valves 28 may receive pressure information from pressure sensors 12 arranged in the network 2.

Figure 2:
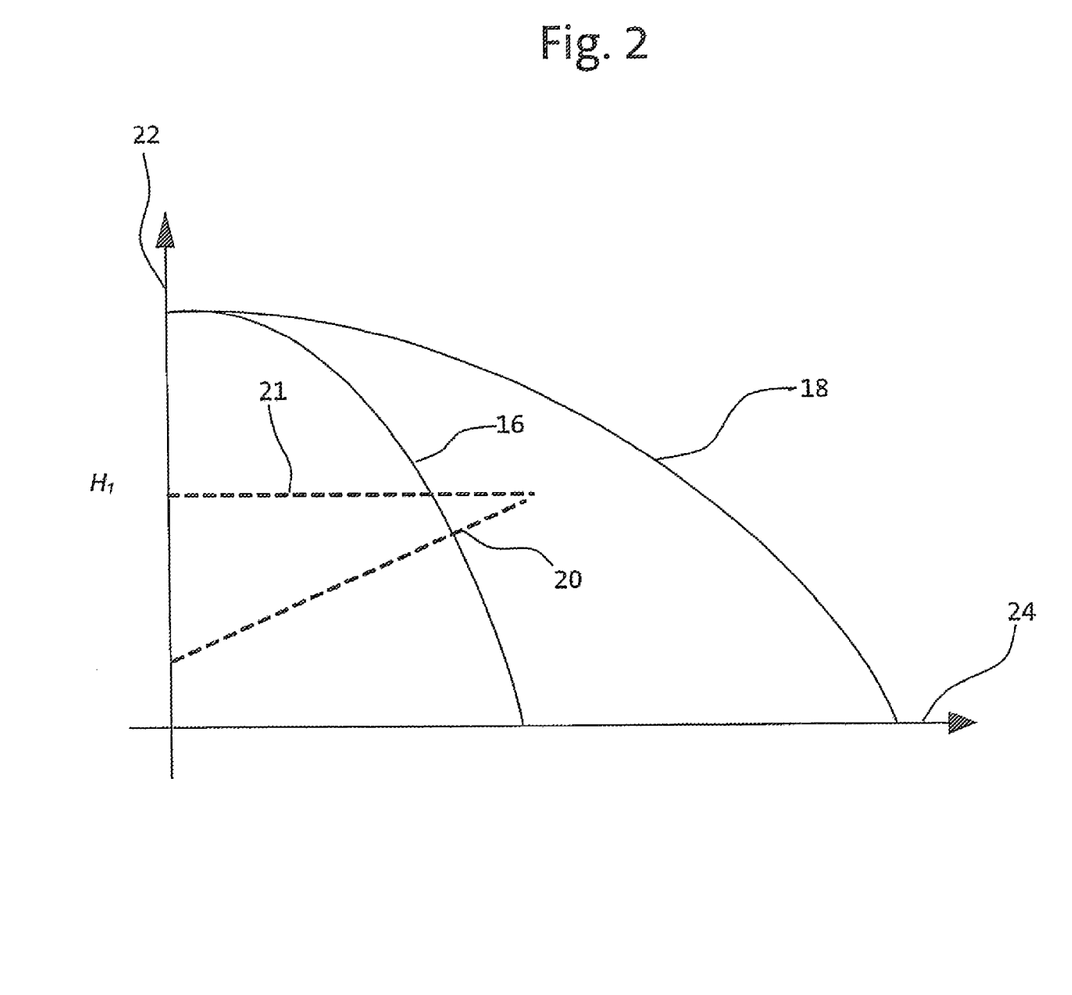
FIG. 2 shows a prior art pump curve together with a pump curve according to an embodiment of the invention.

FIG. 2 illustrates a prior art pump curve 21 and a pressure curve 20 according to an embodiment of the present invention. The pressure curves 20, 21 show the pressure 22 as function of the flow 24. The pump curve 16 for one pump is presented together with the pump curve 18 for two pumps in the same graph as the pressure curves 20, 21 for regulation of the pressure. The graph shows that the prior art pump curve 21 is a constant curve corresponding to a pressure $H_1$. The pressure curve 20 according to an embodiment of the present invention is a proportional curve defining a linear relationship between the flow 24 and pressure 22. It can be seen that pressure regulation by using the pressure curve 20 according to an embodiment of the present invention will lower the pressure dramatically, especially in the low flow area.

Figure 3:
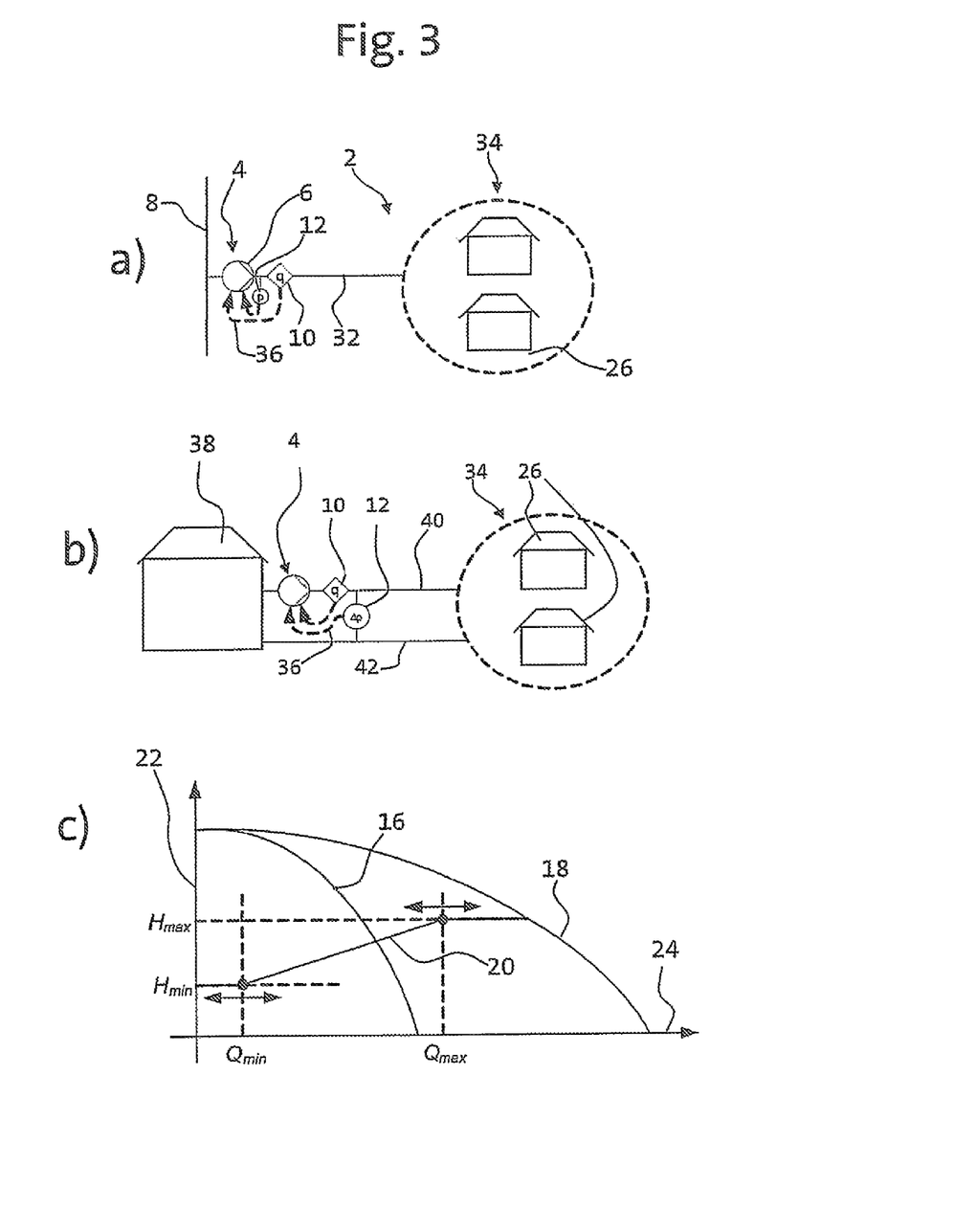
FIG. 3a shows a water distribution network according to an embodiment of the invention.
FIG. 3b shows a district heating network according to an embodiment of the invention.
FIG. 3c shows a pump curve that is intended to regulate a distribution network.

FIG. 3a illustrates an example of a water distribution network 2 according to an embodiment of the invention. A pump station 4 is provided near the supply line 8 of the network 2. The network may include several pumps 6 even though only one pump is shown. The network 2 includes a number of end users 26 constituting an end user section 34. A flow sensor 10 and a pressure sensor 12 are arranged at the pipe system 32 between the pump station 4 and the end user section 34. Information 36 is sent from the sensors 10, 12 to the control unit (not shown) in the pump station 4. It would be possible to arrange the flow sensor 10 and the pressure sensor 12 closer to or in the end user section 34 (e.g. at an end user 26). It would also be possible to apply alternative pressure and flow sensing means that may be integrated in one or more pumps 6 of the pump station 4 by way of example.

In FIG. 3b a heat distribution network 2 is illustrated. The heat distribution network 2 includes a heat distribution center 38 and a pump station 4 arranged next to the heat distribution center 38. An inlet pipe 40 is arranged so that heated water can be pumped from the pump station 4 to the end users 26 in the end user section 34. An outlet pipe 42 is arranged parallel to the inlet pipe 40 in the network 2. When the water has been cooled down at the end user 26 in the end user section 34 the water is returned the heat distribution center 38 through the outlet pipe 42. The pressure difference between the inlet pipe 40 and the outlet pipe 42 is being measured by a pressure sensor 12 and this pressure information 36 is send to the control unit (not shown) in the pump station 4. A flow sensor 10 is arranged next to the pump station 4 and flow information is sent to the pump station 4.

When FIG. 3a and FIG. 3b are compared it can be seen that both networks include almost the same elements. In the water distribution network 2 presented in FIG. 3a the absolute pressure is regulated while the pressure difference between the inlet pipe 40 and the outlet pipe 42 is regulated in the heat distribution network 2 shown in FIG. 3b.

In FIG. 3c a pump curve 20 according to an embodiment of the invention is illustrated. The pump curve 20 may be used to control the pressure in a water distribution network 2 like the one presented in FIG. 3a which means that the pressure in the distribution network 2 may be adjusted or maintained according to the pump curve 20. The pump curve 20 may also be used to control the pressure difference between the inlet pipe 40 and the outlet pipe 42 in the heat distribution network 2 shown in FIG. 3b. The pressure 22 is plotted as function of the flow 24. The pump curve 16 can be achieved by using one pump, while the pump curve 18 can be achieved by using two pumps, however; the in the same graph the pressure curve 20 for regulating the pressure in a network as illustrated in FIG. 3a or FIG. 3b is shown. Such pump curve 20 may be achieved by controlling the speed of the pump(s) 6 in the pump station 4.

The graph shown in FIG. 3c illustrates that the maximal flow $Q_{max}$ as well as the minimum flow $Q_{min}$ of the pump curve 20 can be changed. The maximal pressure $H_{max}$ as well as the minimum pressure $H_{min}$ of the pump curve 20 is remained during this regulation strategy.

As long as the flow remains within the interval between $Q_{min}$ and $Q_{max}$ the pressure is regulated by using the pump curve 20. However, if a flow below $Q_{min}$ is detected the lower end of the (flow of the) pump curve 20 is lowered. On the other hand, if a flow above $Q_{max}$ is detected the upper end of the (flow of the) pump curve 20 is increased. In order to make sure that the pressure regulation is adapting to changing conditions it is possible to log all flow near the end points of the pump curve 20 and define the actual $Q_{max}$ as the highest detected flow within a predefined time period and/or define the actual $Q_{min}$ as the lowest detected flow within a predefined time period (so that the pump curve slowly forgets very "old" values). It may be possible to filter (e.g. by using a low pass filter) the detected flow signals so that noise and unwanted signals can be avoided.

Figure 4:
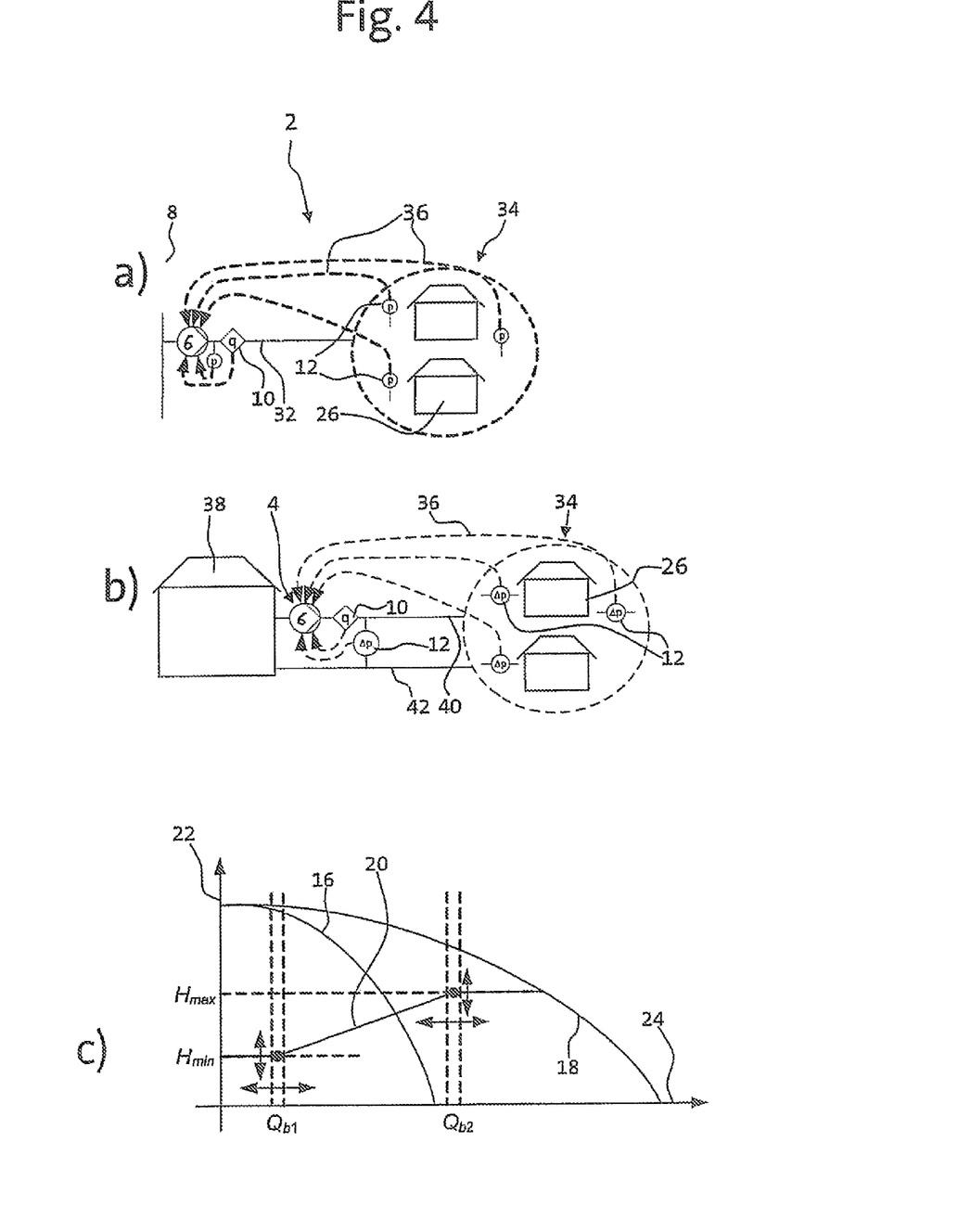
FIG. 4a shows another water distribution networks according to an embodiment of the invention.
FIG. 4b shows another district heating network according to an embodiment of the invention.
FIG. 4c shows a pump curve according to an embodiment of the invention.

FIG. 4a illustrates another example of a water distribution network 2 according to an embodiment of the invention. This network 2 includes the same components as the water distribution network 2 shown in FIG. 3a. However, in addition a number of pressure sensors 12 are arranged in the end user section 34. These pressure sensors 12 are configured to send pressure information 36 to a control unit (not shown) in the pump station 4.

FIG. 4b shows a heat distribution network 2 that is almost equal to the heat distribution network 2 shown in FIG. 4b. The heat distribution network 2 includes a heat distribution center 38 and a pump station 4 arranged next to the heat distribution center 38. A number of pressure sensors 12 are configured to measure pressure difference between the inlet water and the outlet water. The pressure sensors 12 are configured to send pressure information 36 to the control unit (not shown) in the pump station 4.

FIG. 4c shows a pump curve 20 according to an embodiment of the invention. The pump curve 20 is intended to be applied to control the pressure in a water distribution network 2 like the one presented in FIG. 4a or the pressure difference between the inlet pipe 40 and the outlet pipe 42 in the heat distribution network 2 shown in FIG. 4b. Like in FIG. 3c the pressure 22 is plotted as function of the flow 24. A pump curve 16 may be achieved by using one pump and the pump curve 18 can be achieved by using two pumps. The pressure curve 20 for regulating the pressure in a network is illustrated as a proportionality curve (the pressure is a linear function of the flow). This pump curve 20 can be achieved by controlling the speed of the pump(s) 6 in the pump station 4.

In the following, one preferred method for updating the pump curve 20 is described. Pressure detections (e.g. measured by pressure sensors) in the network 2 are used to carry out the update of the pump curve 29. It is assumed that one pressure and one pressure reference are related to each measurement point. In one preferred embodiment of the invention it is defined that all measured pressures should exceed their reference, hence we define the following variable for the curve update procedure:

$$p_{diff} = \min_i p_i - p_{ref,i}.$$

However, maximum value, mean value or others could also be used depending on the requirements of the network 2.

The control of the pump is done according to a pump curve. In the case where the pump curve is quadratic it is described by the following expression $$p_{pump} = aQ^2 + bQ + c.$$

Figure 5:
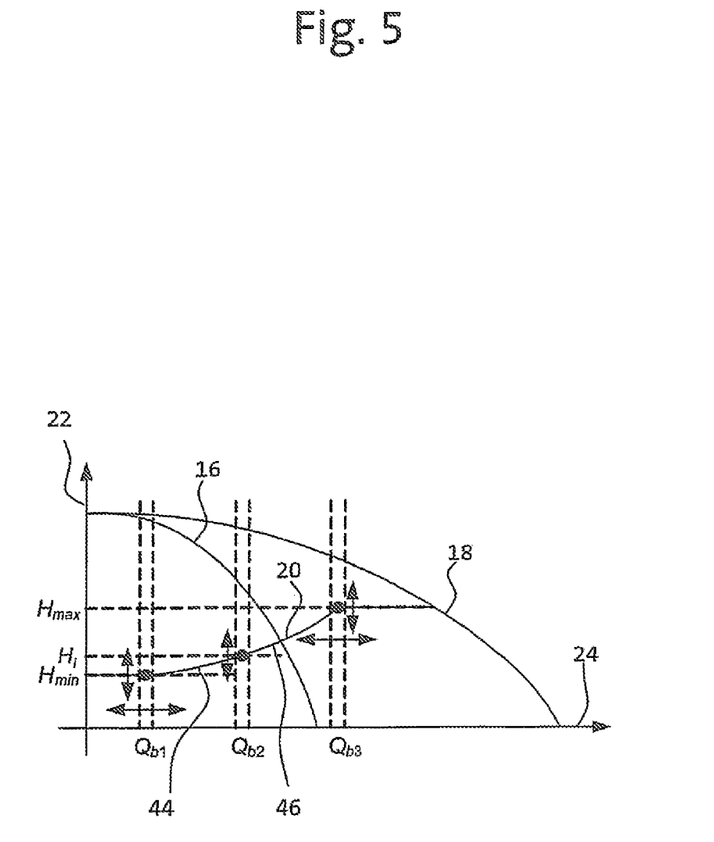
FIG. 5 shows a quadratic pump curve according to an embodiment of the invention.

Each time the pump flow Q is inside one of the regions shown in FIG. 4c or FIG. 5 pressure information on the sensors 12 in the network is requested and the pump curve parameters are updated according to this information. Each flow band can be defined by a middle value ($Q_{bj}$ for the $j^{th}$ band) and width $\delta Q$ such that the band is given by:

$$[Q_{bj} - \delta Q : Q_{bj} + \delta Q]$$

The average values of the flow bands are updated according to the behaviour of the flow in the system, whereas $\delta Q$ is a design constant.

The following matrix and vector is used for describing how the update of the curve parameters is done $$\bar{\bar{A}} = \begin{bmatrix} Q_{b1}^2 & Q_{b1} & 1 \\ Q_{b2}^2 & Q_{b2} & 1 \\ Q_{b3}^2 & Q_{b3} & 1 \end{bmatrix} \quad \bar{\theta} = \begin{bmatrix} a \\ b \\ c \end{bmatrix}.$$

In fact $Q_{b1}$, $Q_{b2}$, and $Q_{b3}$ are not constant; they are varying according to the flows detected in the network 2. In the case where the flow is in band 1, meaning that the pump flow $Q_{b1} - \delta Q < Q < Q_{b1} + \delta Q$, a request for the pressure information from the sensors 12 in the network k is sent. The requested information can be recalculated to obtain $p_{diff}$ and the update can be done by the following expression:

$$\bar{\theta}_{k+1} = \bar{\theta}_k + \bar{\bar{A}}^{-1} \begin{bmatrix} \kappa p_{diff} \\ 0 \\ 0 \end{bmatrix},$$

where k and k+1 means that the $k^{th}$ updated parameter vector is used to calculate the k+1$^{th}$ parameter vector. In the case of updates based on measurements from band 2 and 3 the following expressions can be used:

$$\bar{\theta}_{k+1} = \bar{\theta}_k + \bar{\bar{A}}^{-1} \begin{bmatrix} 0 \\ \kappa p_{diff} \\ 0 \end{bmatrix} \quad \bar{\theta}_{k+1} = \bar{\theta}_k + \bar{\bar{A}}^{-1} \begin{bmatrix} 0 \\ 0 \\ \kappa p_{diff} \end{bmatrix}$$

Thus, FIG. 4c and FIG. 5 illustrate that both the maximal pressure parameter $H_{max}$, the minimum pressure parameter $H_{min}$ and the flow bands can be changed. FIG. 4c shows how to adapt a proportional pressure curve 20. FIG. 5 shows how to adapt quadratic pressure curve 20. In FIG. 5 three adjustment points are used. Accordingly, both the maximal pressure parameter $H_{max}$, the minimum pressure parameter $H_{mm}$, the intermediate pressure $H_i$ and the flow bands can be changed. An alternative implementation would be to use two points and define the gradient at zero flow to be equal to zero since information about at least three parameters of a quadric curve is needed in order to define it. FIG. 4c and FIG. 5 illustrates that it is possible to change the pump curve 20 in a various ways by using these regulation strategies.

The pump curve 20 may be changed in order to meet an optimisation criterion that may be selected by the manager of the distribution network 2. One optimisation criterion may be to provide the lowest possible pressure and still securing that the required minimum pressure is provided everywhere in the distribution network 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A system for controlling the pressure of a fluid in a distribution network (2), the system comprising:
   at least one pump station (4) having a number of pumps (6) that are configured to pressurise the fluid from a supply line (8);
   means (10) for determining at least one flow value (Q) of at least a part of the distribution network (2) and
   a control unit for controlling the activity and speed of the pump(s) (6) of the pump station (4) according to a predefined pump curve (20) defining the relationship between the pressure (22) and the flow (24) of the fluid pressurised by the pump station (4),
   wherein the control unit is configured to change the pump curve (20) automatically according to at least one determined flow value (Q), which is determined by a flow measurement provided by a flow sensor or which is determined by a calculation or estimation, and
   wherein the at least one flow value (Q) is a determined maximal flow ($Q_{max}$) and/or a minimum flow ($Q_{min}$) of the fluid pressurised by the pump station (4) within a predefined time period and the control unit is configured to adjust:
(a) the maximal flow of the pump curve according to a determined max flow ($Q_{max}$) and/or
(b) the minimum flow of the flow curve according to a determined minimum flow ($Q_{min}$).

2. The system according to claim 1, wherein the at least one flow value (Q) is measured continuously and that the control unit is configured to change the pump curve (20) automatically by changing a maximum flow parameter and/or a minimum flow parameter of a predefined pump curve (20) as function of time.

3. The system according to claim 1, wherein at least one pressure sensor (12) is arranged in the distribution network and that the control unit is configured to change a maximal pressure parameter and/or a minimum pressure parameter and/or one or more intermediate pressure parameters of the pump curve (20) automatically according to at least one pressure value provided by at least one pressure sensor (12).

4. The system according to claim 3, wherein the control unit is configured to change the maximal pressure parameter and/or the minimum pressure parameter and/or one or more intermediate pressure parameters of the pump curve (20) automatically when a max flow ($Q_{max}$) and/or a minimum flow ($Q_{min}$) and/or a pressure value is determined.

5. The system according to claim 3, wherein the control unit is configured to change the pump curve (20) automatically according to corresponding flow and pressure values determined in the distribution network (2).

6. The system according to claim 5, wherein the control unit is configured to optimise the pump curve (20) according to predefined pressure values provided by at least one of the pressure sensors (12).

7. The system according to claim 3, wherein the at least one pressure sensor (12) is configured to communicate wirelessly with the control unit.

8. The system according to claim 3, wherein at least one sensor (12) is arranged at a point in the distribution network (2) where a minimum pressure is expected and/or at a point in the distribution network (2) where the pressure is expected to exceed a predefined value.

9. A method for controlling the pressure of a fluid in a distribution network comprising at least one pump station (4) having a number of pumps (6) for pressurizing the fluid from a supply line (8), the method comprising:
determining at least one flow value (Q) of at least a part of the distribution network (2);
controlling the activity and speed of the pumps (6) of the pump station according to a predefined pump curve (20); and
generating a pressure according to the predefined pump curve (20) defining the relationship between the pressure (22) and the flow (24) of the fluid pressurized by the pump station (4),
wherein the pump curve (20) is changed automatically according to at least one determined flow value, wherein the determination is based on a flow measurement provided by a flow sensor or on a calculation or estimation, and wherein the at least one flow value (Q) is a determined max flow ($Q_{max}$) and/or a minimum flow ($Q_{min}$) of the fluid within a predefined time period and
the maximal flow of the pump curve (20) is set to the determined max flow ($Q_{max}$) and/or the minimum flow of the flow curve is set to the determined minimum flow ($Q_{min}$).

10. The method according to claim 9, wherein the at least one flow value (Q) is measured continuously and that the pump curve (20) is changed automatically by changing a maximum flow parameter and/or a minimum flow parameter of a predefined pump curve (20) as function of time.

11. The method according to claim 9, wherein the pump curve (20) is changed automatically according to corresponding flow and pressure values determined in the distribution network (2).

12. The method for controlling the pressure of a fluid in a distribution network (2) according to claim 9, wherein a system according to claim 7 is used.

13. The method according to claim 9, wherein:
(a) at least one flow is measured in the distribution network (2);
(b) it is determined whether the at least one measured flow lies within a predefined flow area;
(c) at least one pressure is measured in the distribution network (2);
(d) a pump curve (20) is calculated so that the difference between the measured pressure and a predefined pressure is minimised; and
(e) the pressure of the fluid in the distribution network (2) is regulated according to the calculated pump curve (20).

14. The method according to claim 12, wherein
(a) at least one request signal is sent from the control unit to one or more pressure sensors (12) in the distribution network (2) and that;
(b) pressure information is sent from the one or more pressure sensors (12) in the distribution network (2) to the control unit and that
(c) a pump curve (20) is calculated so that the difference between the measured pressure and a predefined pressure is minimised
(d) the pressure of the fluid in the distribution network (2) is regulated according to the calculated pump curve (20).

15. The method according to claim 14, wherein at least one pressure sensor (12) arranged in the distribution network (2) is configured to generate an alarm if the measured pressure and/or pressure difference is above a first predefined value or below a second predefined value.

16. The method according to claim 14, wherein the data transfer between a sensor (10, 12) in the distribution network (2) and the control unit is wireless.

17. The method according to claim 9, wherein different predefined sets of curves are used to regulate the pump curve 20 at different time periods.

* * * * *